United States Patent [19]

Forster

[11] Patent Number: 5,457,662

[45] Date of Patent: Oct. 10, 1995

[54] PROCESS AND DEVICE FOR LOCATING NOISE EMITTERS WITH AN ANTENNA CONSISTING OF PASSIVE ACOUSTIC BUOYS

[75] Inventor: Philippe Forster, Aulnay Sous Bois, France

[73] Assignee: Thomson-CSF, Paris, France

[21] Appl. No.: 284,612

[22] PCT Filed: Mar. 10, 1993

[86] PCT No.: PCT/FR93/00240

§ 371 Date: Aug. 29, 1994

§ 102(e) Date: Aug. 29, 1994

[87] PCT Pub. No.: WO93/18416

PCT Pub. Date: Sep. 16, 1993

[30] Foreign Application Priority Data

Feb. 13, 1992 [FR] France .................................. 92 03005

[51] Int. Cl.$^6$ ........................................................ G01S 15/00
[52] U.S. Cl. ........................... 367/119; 367/121; 367/124; 367/129; 367/153
[58] Field of Search .......................... 367/153, 155, 367/118, 119, 121, 124, 127, 129, 5

[56] References Cited

U.S. PATENT DOCUMENTS

| | | | |
|---|---|---|---|
| 5,070,484 | 12/1991 | Mantel | 367/124 |
| 5,216,640 | 6/1993 | Donald et al. | 367/124 |
| 5,339,281 | 8/1994 | Narendra et al. | 367/5 |
| 5,357,484 | 10/1994 | Bates et al. | 367/118 |
| 5,377,162 | 12/1994 | Jestin et al. | 367/124 |

*Primary Examiner*—J. Woodrow Eldred
*Attorney, Agent, or Firm*—Oblon, Spivak, McClelland, Maier & Neustadt

[57] ABSTRACT

The invention relates to a device for locating noise emitters with an antenna comprising passive sensors. In a preferred variant, the antenna consists of N acoustic buoys each comprising a pair of hydrophone dipoles exhibiting a double-eight directivity diagram. Each buoy comprises a compass providing a signal $K_n$ representing the heading relative to magnetic North. The pairs of signals ($a_1$–$b_1$ to $a_N$–$b_N$) are subjected to a rotation by the angle $K_n$. The signals are next digitized and the number P of noise emitters estimated. The locating of these noise emitters can be performed according to two variants (8, 9).

10 Claims, 2 Drawing Sheets

PROCESS AND DEVICE FOR LOCATING NOISE EMITTERS WITH AN ANTENNA CONSISTING OF PASSIVE ACOUSTIC BUOYS

The present invention concerns a process and a device making it possible to locate one or more noise emitters using signals gathered by an antenna of unknown geometry consisting of passive acoustic buoys.

Passive acoustic buoys are used, for example, by aircraft for detecting, locating and classifying underwater vehicles. The signal processing methods currently employed for the signals gathered on board the aircraft are essentially non-coherent: that is to say each buoy provides, after detection, measurements of frequency or measurements of frequency and of azimuth; the locating of the targets is performed subsequently using these measurements.

Given the reduction in the noise levels radiated by underwater vehicles, the individual performance of passive buoys, in detection, becomes low and will become even lower with regard to the very quiet underwater vehicles of the future. This is why the development and study of antenna processing methods applicable to an array of buoys (whose positions are poorly known) is important.

Various methods of processing an antenna of hydrophones whose positions are poorly known or even unknown have been proposed over the last fifteen years or so.

A first series of methods uses auxiliary sources whose positions are known. By way of example, such methods are described in the following articles:

"A self-survey technique for self-cohering of antenna systems" by C. N. Dorny, IEEE-AES, November, 1978, pp. 977–991.

"Cohering of an experimental non rigid array by self-survey" by C. N. Dorny et al.; IEEE-AES, November, 1980, pp. 902–904.

A second series of methods uses auxiliary sources whose positions are unknown. By way of example, such methods are described in the following articles:

"Array shape calibration using sources in unknown locations - Part I", by Y. Rockah and P. M. Schultheiss, IEEE-ASSP, March, 1987, pp. 286–299

"Array shape calibration using sources in unknown locations—Part II", by Y. Rockah and P.M. Schultheiss, IEEE-ASSP, June 1987, pp. 724–735.

The auxiliary sources can be, for example, active, that is to say transmitting, buoys. These sources serve to determine the geometry of the antenna and the signals which they transmit must be separated in time or in frequency. Having carried out the calibration of the antenna, the locating of the noise emitters can be carried out by any antenna processing method. The calibration of the antenna can be carried out by triangulation.

The requirement for auxiliary sources in the aforesaid processing methods is constraining in practice and a method making it possible to dispense therewith has been developed. This method applies solely in the case of wide-band signals and its implementation requires the presence of at least three noise emitters. These noise emitters are existing sources of noise, such as ships. This method is described in the following articles:

"Localisation de sources ponctuelles avec une antenne de géométrie inconnue" ("The locating of point sources with an antenna of unknown geometry") by P. Nicolas and G. Vezzosi, GRETZI 85, pp. 331–337

"Estimation of phase angles from the cross-spectral matrix" by G. Vezzosi, IEEE-ASSP, June 1986, pp. 405–422

Time delay estimation using an eigenstructure based spectral method" by G. Vezzosi and P. Nicolas, 25th Conf. on Decision and Control", pp. 949–952.

Finally, an antenna processing method dubbed ESPRIT has been developed in the particular case of an array of unknown geometry consisting of two sub-arrays, one of which is the translated version of the other, the translation vector making it possible to transfer from one sub-array to the other being known.

This method is described in the following documents:

"A subspace rotation approach to signal parameter estimation", by A. Paulraj, R. Roy and T. Kailath "Proc of the IEEE "Proc of the IEEE" July 1986, pp. 1044–1045

"ESPRIT-Estimation of signal parameters via rotational invariance techniques" by R. Roy and T. Kailath, IEEE-ASSP, July 1989, pp. 984–995 and the U.S. Pat. No. 4,750,147.

However, the implementation of this method requires recourse to servomechanisms in order to perform orientation operations on the various component elements of the antenna.

The invention aims to alleviate the drawbacks just alluded to of the prior art.

It makes it possible to locate several narrowband sources with the aid of an antenna of unknown geometry consisting of buoys using directional hydrophones without any restrictive assumption about the minimum number of noise emitters and about the geometry of the antenna. Neither does it require the addition of auxiliary sources, nor the need for recourse to servomechanisms in order to orient the elements of the antenna. In a preferred variant, the buoys are of the type known by the acronym "DIFAR" ("Directional Frequency Analysis and Recording").

The main characteristics of this type of buoy will be recalled later.

The process of the invention allows a very high accuracy. Under ideal conditions: hydrophone gains. adjusted to the nominal gains, infinite number of observations, spatially white noise; this process makes it possible to determine the azimuths of the noise emitters with infinite accuracy.

The subject of the invention is therefore a process for locating noise emitters with an antenna consisting of N directional acoustic sensors associated with N transducers of sound signals received from each noise emitter; each of the said acoustic sensors being furnished with means generating a magnitude representing the heading relative to terrestrial magnetic North; characterized in that, the said directional sensors consisting of a pair of dipoles exhibiting a double-eight directivity diagram, the maxima of which are aligned with mutually orthogonal first and second axes, this process comprises at least the following steps:

generation by each sensor of a pair of analog signals, the responses of the dipoles along the said first and second orthogonal axes rotation of each of the pairs of signals by an angle $K_n$, with $K_n$ the heading of buoy n and $1<n<N$, so as to generate a new pair of signals $x_n(t)$ and $y_n(t)$, such that $A_n(t)$ being the signal associated with the first axis and $B_n(t)$ the signal associated with the second axis, the following relation holds:

$$\begin{bmatrix} x_n(t) \\ y_n(t) \end{bmatrix} = \begin{bmatrix} \cos(K_n) & -\sin(K_n) \\ \sin(K_n) & \cos(K_n) \end{bmatrix} \begin{bmatrix} A_n(t) \\ B_n(t) \end{bmatrix}$$

sampling with the aid of a signal of specified frequency of these signals and their conversion into digital signals generation of the spectral matrix of the signals thus converted decomposition of the spectral matrix into eigenelements ($u_1$ to $u_{2N}$, $\lambda_1$ to $\lambda_{2N}$)

estimation of the number P of noise emitters by determining the multiplicity of the smallest eigenvalue of the spectral matrix generation of at least two matrices, $U_1$ and $U_2$, with N rows and P columns, N and P being respectively the number of buoys and the number of estimated noise emitters, such that the following relation is satisfied:

$$\begin{bmatrix} U_1 \\ \overline{U_2} \end{bmatrix} = [\underline{u}_1 \vdots \underline{u}_2 \vdots \ldots \vdots \underline{u}_p]$$

in which $u_1$ to $u_p$ are the eigenvectors of the spectral matrix ($\Gamma$)

generation of a third matrix U, likewise with N rows and P columns, such that the columns form an orthonormal basis common to the vector spaces spanned by the columns of the matrices $U_1$ and $U_2$ and the locating of the said P noise emitters by using at least the matrices U, $U_1$ and $U_3$; the said locating consisting in generating a sequence of values $\theta_1$ to $\theta_p$) representing the estimated azimuths of the noise emitters, modulo 180°.

A further subject of the invention is a device for the implementation of this process.

The invention will be better understood and other characteristics and advantages will emerge with the aid of the description which follows with reference to the appended figures and in which.

The process of the invention will now be described with the aid of an illustrative embodiment of a device implementing this process.

In a preferred variant of the process of the invention, use is made of an antenna consisting of passive elements based on buoys known by the name of "DIFAR" or "Direction Frequency Analysis and Recording".

The type of antenna is known and it is not profitable to describe it in detail. Reference may usefully be made to the U.S. Pat. Nos. 4,205,396, 3,603,921 or 3,444,508, by way of non-limiting examples.

It is however profitable briefly to recall the principal characteristics of such an antenna.

An antenna of this type utilises directional hydrophones. Each buoy making up the antenna comprises at least two hydrophone dipoles. The dipoles used exhibit a so-called "cosine" figure-of-eight direction diagram. The two dipoles are oriented such that the directivity diagrams are orthogonal.

Figure 1:
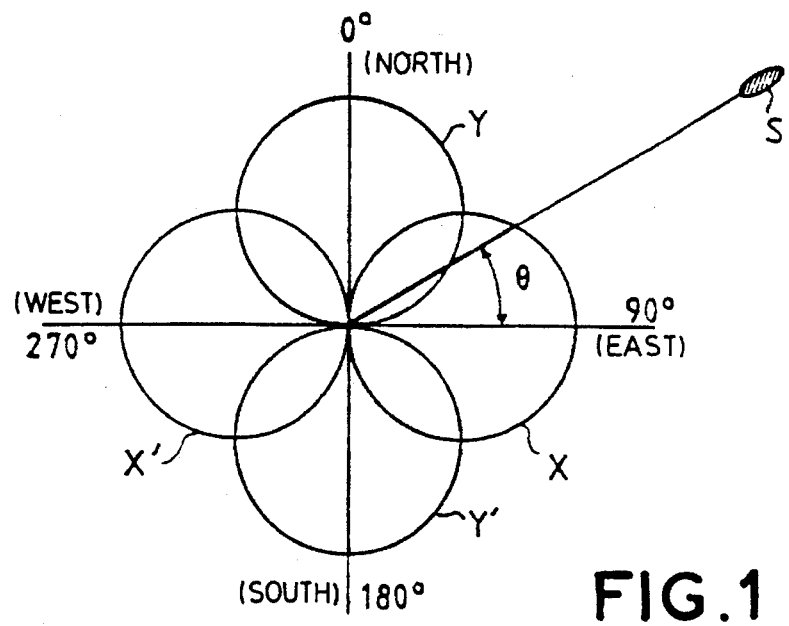
FIG. 1 is a diagram illustrating the functioning of a buoy of "DIFAR" type.

FIG. 1 illustrates directivity diagrams of a buoy of DIFAR type. Naturally, the "NORTH-SOUTH" and "EAST-WEST" orientations are purely arbitrary and should be understood with respect to the maxima defined by the directivity diagram. In the figure, X—X' labels the two lobes of the directivity diagram of the first dipole and Y—Y' the lobes of the directivity diagram of the second dipole. A noise source has been represented with the reference S. It is assumed that this source S is situated a considerable distance from the buoy. We speak of the far field. It is assumed that the sound waves are received with angle of incidence θ relative to the "WEST-EAST" axis of the buoy.

The signal output by the first hydrophone dipole obeys the relation (diagram X—X'):

$$S_x = A \cos \theta \tag{1}$$

Similarly, the signal output by the second hydrophone dipole obeys the relation (diagram Y—Y'):

$$S_y = A \sin \theta \tag{2}$$

In these relations, A is a value indicative of the sound intensity level at the location of the receiving buoy. This value A is identical in the two equations since the hydrophones are assumed to have the same sensitivity.

In a preferred variant of the invention, N buoys of the type just described are used; the set of these N buoys forms an antenna of unknown geometry. These buoys may have been dropped, for example, from an aircraft.

The buoys are characterized by the fact that they provide, in the presence of P far-field noise emitters, signals of the form:

$$\begin{bmatrix} a(t) \\ b(t) \end{bmatrix} = \sum_{i=1}^{P} s_i(t) \begin{bmatrix} \cos \phi i \\ \sin \phi i \end{bmatrix} + \begin{bmatrix} n(t) \\ m(t) \end{bmatrix} \tag{3}$$

a relation in which a(t) and b(t) are the signals present on the respective outputs of the so-called "North-South" and "East-West" dipoles of a given buoy, n(t) and m(t) the background noise at the outputs from these same dipoles and 1 to p the bearings of the P noise emitters relative to the buoy's North, the parameter t naturally represents time. The buoy furthermore includes a compass which provides its heading relative to magnetic North.

This equation (3) is in reality merely the generalization to P sources, while also taking the background noise into account, of equations (1) and (2).

Figure 2:
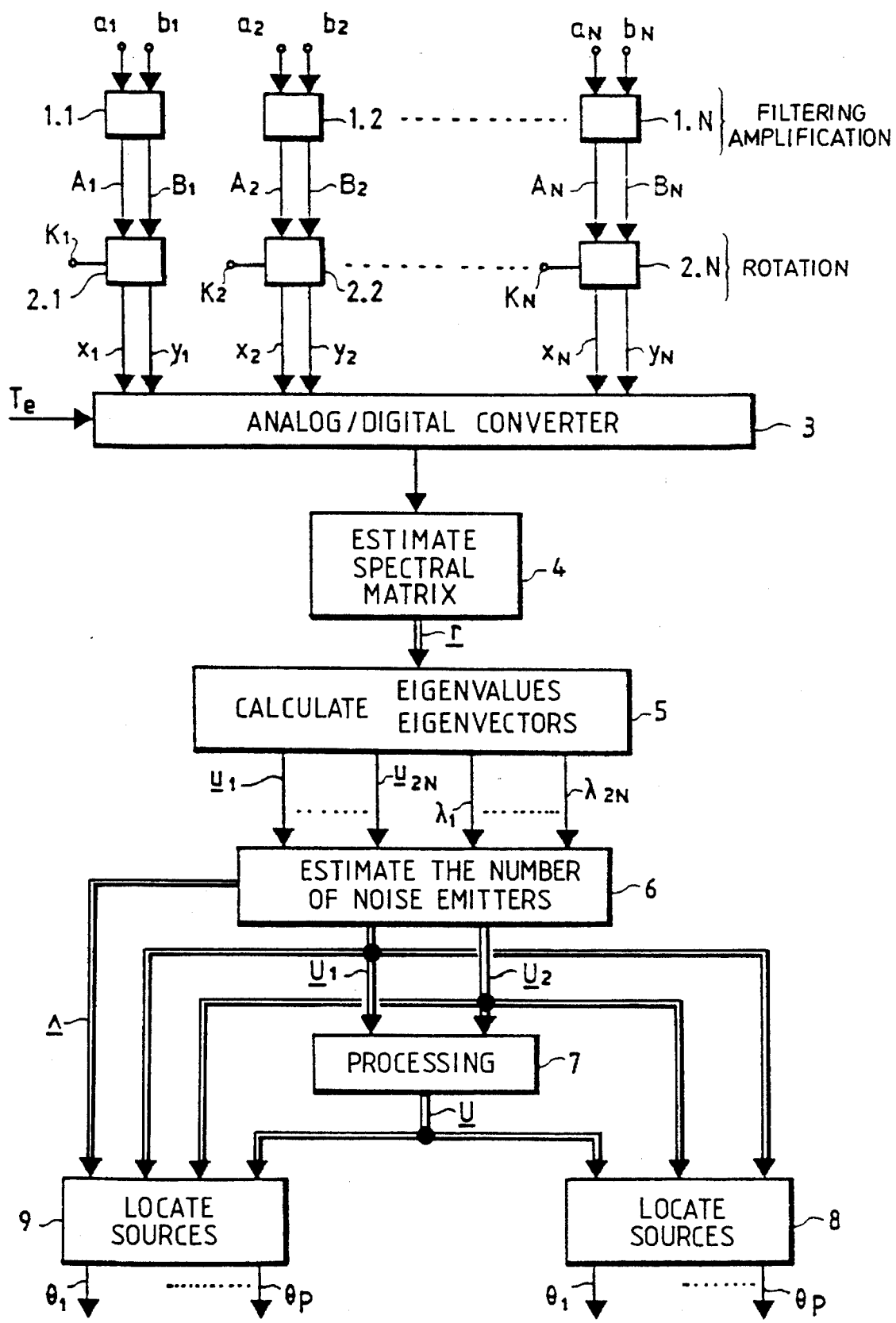
FIG. 2 illustrates schematically a device according to the invention.

FIG. 2 illustrates schematically a device according to the invention. As mentioned, the antenna is composed of N buoys numbered 1 to N; an individual buoy of this set is numbered n, by convention. For simplicity, in what follows, the references "N-S" will be used for "North-South" and "E-W" for "East-West".

For each buoy n, the signals $a_n(t)$ and $b_n(t)$ from the dipoles "N-S" and "E-W" are processed in a conventional manner by an amplifying and filtering circuit 1.n. In FIG. 2, these devices are represented by boxes 1.1 to 1.N.

In order to be usable these signals must be "aligned" relative to the same reference axis. We choose magnetic North.

To do this, each buoy is furnished with a compass, as has been indicated.

The outputs $A_n(t)$ and $B_n(t)$ from any circuit sound feed a circuit 2.n corresponding thereto. The latter subjects them to a rotation by an angle $K_n$, where $K_n$ denotes the heading of the nth buoy relative to magnetic North, so as to provide the signals $x_n(t)$ and $y_n(t)$ defined by the relation:

$$\begin{bmatrix} x_n(t) \\ y_n(t) \end{bmatrix} = \begin{bmatrix} \cos(K_n) & -\sin(K_n) \\ \sin(K_n) & \cos(K_n) \end{bmatrix} \begin{bmatrix} A_n(t) \\ B_n(t) \end{bmatrix} \quad (4)$$

As was indicated, the heading $K_n$ is provided by a compass associated with each buoy.

It is noted that the device of the invention allows the necessary "aligning" of the buoys very simply through an "electric rotation".

The signals from the circuits 2.1 to 2.N are next sampled at a sampling rate $T_e$ tied to the upper cutoff frequency of the filtering circuits 1-1, ..., 1-N and then digitized by an analog/digital converter 3.

The vectorial samples are given by the relation:

$$x(n) = [x_1(nT_e), \ldots, x_N(nT_e), y_1(nT_e), \ldots, y_N(nT_e)]^T \quad (5)$$

in which the values $x_1(nT_e)$ to $x_N(nT_e)$ are the so-called "N-S" signals and the values $y_1(nT_e)$, the so-called "E-W" signals. Hence, 2N signals are available: two per buoy.

These signals, present at the output of the analog/digital converter 3, are processed by a circuit 4 which estimates their spectral matrix at the analysis frequency by a method of spectral estimation consisting for example of a temporal weighting of the data followed by a temporal averaging of periodograms (or by a frequency smoothing); the number of averaged (or smoothed) periodograms must be greater than or equal to the number of buoys. The minimum frequency resolution of the spectral analysis must satisfy the inequality:

$$\Delta f \ll c/d, \quad (6)$$

a relation in which c denotes the speed of sound and d the maximum distance between two buoys, a factor of ten being generally sufficient between the two sides of this inequality. It should be clearly understood that a knowledge of d does not imply a knowledge of the geometry of the antenna. An order of magnitude or an estimate of this distance, for example after dropping the buoys, is sufficient. The total time of a spectral analysis must not exceed the presumed stationarity time of the signals.

The spectral matrix Γ estimated by the circuit 4 is decomposed into eigenelements by a circuit 5 which calculates its eigenvalues $\{\lambda_1 > \lambda_2 \ldots > \lambda_{2N}\}$ and the associated eigenvectors $\{u_1, \ldots, u_{2N}\}$, using a method of matrix diagonalization.

At this juncture, it is possible to estimate the number P of noise emitters. This can be done by testing the multiplicity of the smallest eigenvalue of the spectral matrix. The sphericity test, for example, may be employed: comparison of the ratio of the geometric and arithmetic means of the smallest eigenvalues against a threshold. The circuit 6 next forms two matrices, $U_1$ and $U_2$, each having N rows and P columns. These matrices are such that the following relation is satisfied:

$$\begin{bmatrix} U_1 \\ U_2 \end{bmatrix} = [u_1 : u_2 : \ldots : u_p] \begin{matrix} \} N \text{ rows} \\ \} N \text{ rows} \end{matrix} \quad (7)$$

Circuit 6 also generates the diagonal matrix Λ defined by the relation:

$$\Lambda = \text{diag}\{\lambda_1 - \sigma, \ldots, \lambda_p - \sigma\} \quad (8)$$

in which $\sigma = (\lambda_{p+1} + \ldots \lambda_N)/(N-p)$

The purpose of this operation is to extract the "background noise" from the source signals.

Figure 3:
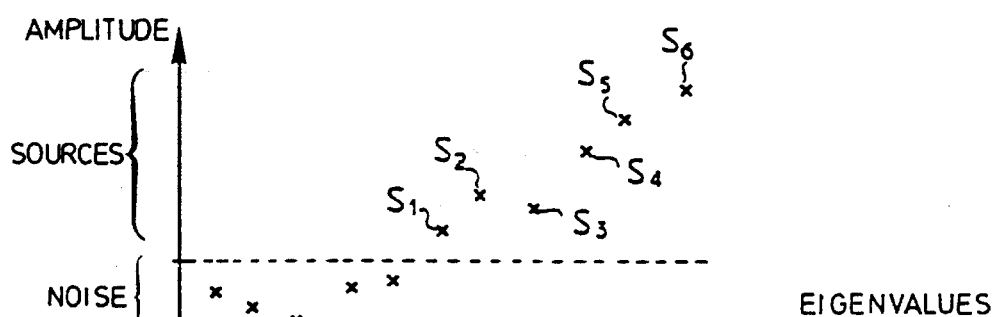
FIGS. 3 and 4 are diagrams illustrating two variant embodiments of the invention.

The processing carried out by circuits 4 to 6 can conform to that described in the article by Laurent KOPP and Georges BIENVENU: "Détection par les valeurs propres de la matrice interspectrale: Adaptation au bruit de fond" ("Eigenvalue-based detection of the cross-spectral matrix: Adaptation to background noise") published in "Neuvième colloque sur le Traitement du Signal et ses Applications" ("Ninth colloquium on Signal Processing and its Applications"), 16–20 May 1983, pages 265–270. One of the teachings of this article is that, if the amplitudes of the eigenvalues are considered, the smallest ones correspond to the background noise and the largest ones to the sources. This procedure is schematically shown in FIG. 3. In the example illustrated in this figure, six eigenvalues correspond to sources arbitrarily labelled $S_1$ to $S_6$, the others being regarded as corresponding to background noise.

A circuit 7 next calculates a matrix $U_{N \times P}$ whose columns form an orthonormal basis common to the vector spaces spanned by the columns of the matrices $U_1$ and $U_2$. Naturally, this involves an approximation since the errors due to the measurements must be taken into account.

One solution is to choose for U the matrix formed by the P left singular vectors associated with the P largest singular values of the matrix NX2P[$U_1$:$U_2$].

This method conforms with that taught in the aforesaid U.S. Pat. No. 4,750,147. It should however be clearly understood that the invention does not require recourse to two sub-arrays linked by a known translation vector.

Following these operations, the sound sources or noise emitters can be located.

According to the invention, the locating proper can be performed according to two variant embodiments.

These two variants are shown schematically in FIG. 2, by the circuits 8 and 9 respectively. These two circuits use, on the one hand, the matrices $U_1$ and $U_2$ and, on the other hand, the matrix U just calculated. Furthermore, the circuit 9, and only this circuit, receives the matrix Λ.

The first variant exploits the fact that, if $\Lambda_p$ represents the azimuth of a source p (with 1<p<P), the matrix $U_1$ corresponds to the signals in $\cos \theta_p$ and the matrix $U_2$ to the signals in $\sin \theta_p$. To obtain the signals with a phase $_p$, a matrix multiplication must be performed such that a form in $\exp(i\theta_p)$ is obtained, namely:

$$\begin{bmatrix} 1 & i \\ 1 & -i \end{bmatrix} \begin{bmatrix} \cos \theta_p \\ \sin \theta_p \end{bmatrix} = \begin{bmatrix} e^{i\theta_p} \\ e^{-i\theta_p} \end{bmatrix} \quad (8)$$

This type of operation is performed by the circuit 8.

More precisely, the circuit 8 calculates the P eigenvalues, denoted $\alpha_1$ to $\alpha_p$, of the matrix defined by:

$$[(U_1+iU_2)^*U]^{-1} \times [(U_1-iU_2)^*U] \quad (9)$$

a relation in which the asterisk indicates that this is the conjugate matrix.

Once this operation is carried out, the circuit can output the P estimated azimuths of the noise emitters, namely $\theta_1$ to $\theta_p$; naturally, this is with a 180° ambiguity as is well known.

Methods for removing this ambiguity are likewise well known to those skilled in the art and there is no profit in describing them.

For any sound source or noise emitter p, the estimated azimuth is given by the relation:

$$\theta_p = \tfrac{1}{2} \text{Arg}(\alpha_p) \quad (10)$$

According to the second variant embodiment, the angle θ between two predetermined values normally between −90° and +90° is "rotated". The disappearance of a source is "observed" that is to say when it passes in front of the dipole's directivity zero.

However, this procedure requires that the noise be extracted from the useful signals. To do this, the matrix Λ is used. Circuit 9 performs these operations.

More precisely, circuit 9 calculates, using the matrices U, $U_1$, $U_2$ and Λ, for θ varying from −90° to 90° with a sufficiently small increment (1° for example), the function f(θ) defined as the inverse of the smallest eigenvalue of the matrix complying with the relation:

$$U^*(\sin\theta\, U_1 - \cos\theta\, U_2)\Lambda(\sin\theta\, U_1 - \cos\theta\, U_2)^*U \quad (11)$$

Under these conditions, the estimated azimuths of the noise emitters are provided by the abscissae of the maxima of the function f(θ).

Figure 4:
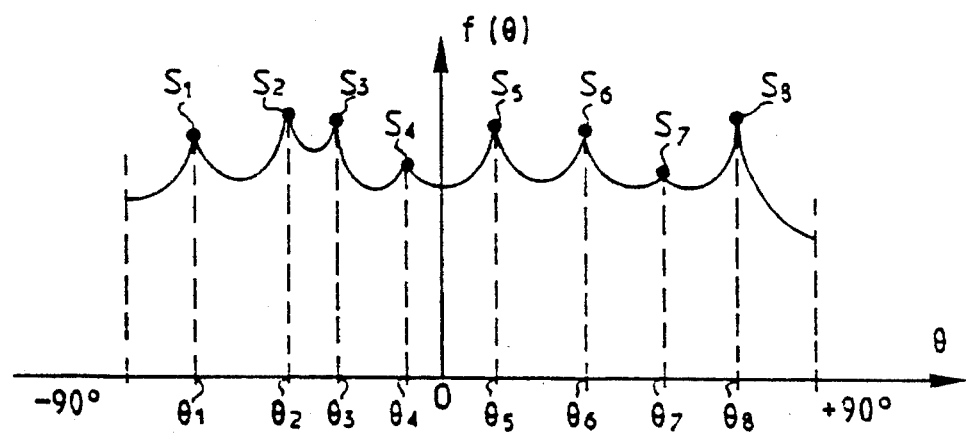

FIG. 4 illustrates this procedure. Represented in this figure is the variation of the curve f(θ) as a function of θ varying from +90° to −90°. The curve f(θ), in the example considered, exhibits eight peaks, corresponding to eight noise emitters arbitrarily labelled $S_1$ to $S_8$. The eight values of θ, $\theta_1$ to $\theta_8$, correspond to the azimuths of the eight noise emitters. The signals $_1\theta$ to $\theta_n$ are available at the output of circuit 9.

By way of example, it will be possible to use around ten buoys of "DIFAR" type to constitute the antenna, preferably a number which is a power of two, namely eight or sixteen. The latter choice makes the numerical calculations easier.

It should be clearly understood that the simultaneous presence of circuits 8 and 9 is in no way necessary. Two variant embodiments of the invention are involved.

The device of the invention can comprise either one of these circuits or, as represented in FIG. 2, both circuits. If circuit 8 alone is utilized, in accordance with what was called the "first variant" embodiment of the invention, there is no profit in generating the matrix Λ which is used by the circuit 9 alone ("second variant").

The invention is not limited to the use of antennas of the "DIFAR" type. Filar antennas including pairs of directional hydrophones can also be employed. By way of non-limiting example, such an antenna is described in the French Patent Application published on 15 Mar. 1991 under No. 2 651 950. This patent application furthermore relates to provisions allowing the removal of the "Right-Left" ambiguity associated with the antenna, what was called the "180° ambiguity" in the present description. In this variant, not represented, the antenna no longer comprises N separate buoys. They are replaced with the N pairs of dipoles making up the linear antenna. Naturally, in accordance with the invention, means must be made available for providing the value of the heading, and this for each dipole.

I claim:

1. Process for locating noise emitters with an antenna consisting of N directional acoustic sensors associated with N transducers of sound signals received from each noise emitter; each of the said acoustic sensors being furnished with means generating a magnitude representing the heading ($K_n$) relative to terrestrial magnetic North; characterized in that, the said directional sensors consisting of a pair of dipoles exhibiting a double-eight directivity diagram (X—X', Y—Y'), the maxima of which are aligned with mutually orthogonal first and second axes ("EAST-WEST", "NORTH-SOUTH"), this process comprises at least the following steps:

generation by each sensor of a pair of analog signals ($a_n$, $b_n$), the responses of the dipoles along the said first and second orthogonal axes rotation of each of the pairs of signals by an angle $K_n$, with $K_n$ the heading of buoy n and 1<n<N, so as to generate a new pair of signals $x_n(t)$ and $y_n(t)$, such that $A_n(t)$ being the signal associated with the first axis and $B_n(t)$ the signal associated with the second axis, the following relation holds:

$$\begin{bmatrix} x_n(t) \\ y_n(t) \end{bmatrix} = \begin{bmatrix} \cos(K_n) & -\sin(K_n) \\ \sin(K_n) & \cos(K_n) \end{bmatrix} \begin{bmatrix} A_n(t) \\ B_n(t) \end{bmatrix}$$

sampling with the aid of a signal of specified frequency ($T_e$) of these signals and their conversion into digital signals (X(n))

generation of the spectral matrix (Γ) of the signals thus converted decomposition of the spectral matrix (Γ) into eigenelements ($u_1$ to $u_{2N}$, $_1$ to $_{2N}$)

estimation of the number P of noise emitters by determining the multiplicity of the smallest eigenvalue of the spectral matrix generation of at least two matrices, $U_1$ and $U_2$, with N rows and P columns, N and P being respectively the number of buoys and the number of estimated noise emitters, such that the following relation is satisfied:

$$\begin{bmatrix} U_1 \\ U_2 \end{bmatrix} = [u_1 : u_2 : \ldots : u_p]$$

in which $u_1$ to $u_p$ are the eigenvectors of the spectral matrix (Γ)

generation of a third matrix U, likewise with N rows and P columns, such that the columns form an orthonormal basis common to the vector spaces spanned by the columns of the matrices $U_1$ and $U_2$ and the locating of the said P noise emitters by using at least the matrices U, $U_1$ and $U_3$; the said locating consisting in generating a sequence of values $\theta_1$ to $\theta_p$) representing the estimated azimuths of the noise emitters, modulo 180°.

2. Process according to claim 1, characterized in that the step of locating the said P noise emitters comprises the following phases:

a first phase of generating the P eigenvalues of the matrix defined by the relation:

$$[(U_1 + iU_2)^*U]^{-1} \times [U_1 - iU_2)^*U],$$

a relation in which $(U_1 + iU_2)^*$ is the conjugate matrix of $(U_1 + iU_2)$ and a second phase of generating the said azimuths, the azimuth $\theta_p$ of a noise emitter p, with 1<p<P, being such that:

$$\theta_p = \tfrac{1}{2}\mathrm{Arg}(\alpha_p)$$

$\alpha_p$ being the eigenvalue of rank p of the matrix generated in the first phase.

3. Process according to claim 1, characterized in that it comprises a further step of generating a diagonal matrix Γ complying with the following relation:

Γ=diag $\{\lambda_1 - \sigma, \ldots, \lambda_p - \sigma\}$ in which $\lambda_1$ to $\lambda_p$ are the eigenvectors of ranks 1 to P of the said spectral matrix (Γ) and σ is given by the relation $=(_{p+1} + \ldots +_N)/(N-P)$ and in that the locating of the said P noise emitters comprises the following phases:

generation of the function $f(\theta)$ such that $f(\theta)$ is the inverse of the smallest eigenvalue of the matrix:

$$[U^*(\sin\theta\, U_1 - \cos\theta\, U_2)\Lambda(\sin\theta\, U_1 - \cos\theta\, U_2)^*U]$$

and determination of the maxima of this function within a specified range of the angle, the values $\theta_p$ of these maxima representing the azimuths of the said P noise emitters $\theta_1$ to $\theta_p$), modulo 180°.

4. Process according to claim 2, characterized in that the said specified range comprises the angles varying from −90° to +90°.

5. Process according to claim 1, characterized in that the said third matrix U is formed by the P left singular vectors associated with the P largest values of the matrix $[U_1 U_2]$, a matrix containing N rows and 2P columns and $U_1$, $U_2$ being the said first and second matrices.

6. Device for implementing the process for locating noise emitters according to any one of claims 1 to 5, characterized in that it comprises first means (1.1 to 1.N)., equal in number to the said number N, for amplifying and filtering the pairs of analog signals $(a_n, b_n)$, second means (2.1 to 2.N) for rotating each of the pairs of signals thus amplified and filtered by an angle representing the magnetic heading $(K_n)$ associated with the directional sensor generating the said pair of analog signals, third means (3) converting the pairs of signals into vectorial digital samples, fourth means (4) generating the said spectral matrix ($\Gamma$) of these samples, fifth means (5) decomposing this spectral matrix ($\Gamma$) into eigenelements ($u_1$ to $u_{2N}$, $\lambda_1$ to $_{2N}$), sixth means (6) estimating from these eigenelements the number P of noise emitters and generating at least a first and a second matrix $U_1$ and $U_2$, obeying the relation:

$$\begin{bmatrix} U_1 \\ U_2 \end{bmatrix} = [\underline{u}_1 \vdots \underline{u}_2 \vdots \ldots \vdots \underline{u}_P]$$

in which $u_1$ to $u_p$ are the eigenvectors of the said spectral matrix ($\Gamma$); seventh means (7) generating from the said first and second matrix a third matrix U such that its columns form an orthonormal basis common to the vector spaces spanned by the columns of the matrices $U_1$ and $U_2$; and eighth means (8 or 9) performing the locating of the P noise emitters from at least the said first, second and third matrix $(U_1, U_2, U)$.

7. Device according to claim 6, characterized in that the eighth means (8) performing the locating of the P noise emitters generate P eigenvalues $\alpha_1$ to $\alpha_p$ of the matrix $$[(U_1+iU_2)^*U]^{-1}\cdot[(U_1-iU_2)^*U]$$

and estimate the azimuths $\theta_1$ to $\theta_p$ of the P noise emitters by performing the successive calculations $\theta_p = \frac{1}{2}\text{Arg}(\alpha_p)$, with $1 < p < P$.

8. Device according to claim 6, characterized in that the sixth means (6) furthermore generate a diagonal matrix $\Lambda$ such that $$\Lambda = diag\{\lambda 1-\sigma, \lambda_{2-\sigma}, \ldots, \lambda P - \sigma\}$$

with $\lambda_1$ and $\lambda_p$ the eigenvalues of the spectral matrix ($\Gamma$) of rank 1 to P; and $\sigma = (\lambda_{P+1} + \ldots + \lambda_N)/(N-P)$, with $\lambda_{P+1}$ to $\lambda_N$ the eigenvalues of the spectral matrix ($\Gamma$) of rank (P+1) to N; and in that it determines the maxima of the function $f(\theta)$, the inverse of the smallest eigenvalue of the matrix:

$$[U^*(\sin\theta\, U_1 - \cos\theta\, U_2)\Lambda(\sin\theta\, U_1 - \cos\theta\, U_2)^*U]$$

the values of $\theta_p$ associated with the maxima of the said function $f(\theta)$ corresponding to the azimuths of the P noise emitters.

9. Device according to claim 6, characterized in that each directional acoustic sensor consists of a pair of hydrophone dipoles, each sensor having two orthogonal directivity axes ("East-West", "North-South"), such as to define a double-eight directivity diagram; and in that each Of these sensors is arranged in a buoy furnished with means generating a signal $(K_n)$ representing the heading relative to magnetic North.

10. Device according to claim 6, characterized in that each directional acoustic sensor consists of a pair of hydrophone dipoles, each sensor having two orthogonal directivity axes ("East-West", "North-South"), such as to define a double-eight directivity diagram; and in that these sensors form a filar antenna of specified length comprising means generating signals representing the headings relative to magnetic North and associated with each of these sensors.

* * * * *